United States Patent [19]
Stojek

[11] 4,441,243
[45] Apr. 10, 1984

[54] CAMSHAFT BEARING AND METHOD FOR MOUNTING THE CAMSHAFT

[75] Inventor: Dieter Stojek, Bergisch Gladbach, Fed. Rep. of Germany

[73] Assignee: Ford Motor Company, Dearborn, Mich.

[21] Appl. No.: 394,391

[22] Filed: Jul. 1, 1982

[30] Foreign Application Priority Data

Jul. 3, 1981 [DE] Fed. Rep. of Germany ....... 3126280

[51] Int. Cl.[3] ........................ B23P 19/04; F16C 33/04
[52] U.S. Cl. ........................................ 29/433; 29/434; 29/759; 74/567; 123/90.6; 384/280
[58] Field of Search ............... 384/276, 280, 281, 294, 384/295, 429; 74/567; 29/435, 445, 758, 759, 433, 428; 123/90.6, 90.31; 464/179

[56] References Cited

U.S. PATENT DOCUMENTS

| | | | |
|---|---|---|---|
| 2,539,782 | 1/1951 | Kell | 384/276 |
| 3,013,542 | 12/1961 | Freyn | 384/294 X |
| 3,059,887 | 10/1962 | Ward, Jr. | 29/428 X |
| 3,089,735 | 5/1963 | Mann | 384/429 |
| 3,382,015 | 5/1968 | Steidl | 29/450 X |
| 4,027,365 | 6/1977 | Froeliger | 29/428 X |
| 4,393,293 | 7/1983 | Inoue et al. | 384/276 X |

*Primary Examiner*—Charlie T. Moon
*Assistant Examiner*—Ronald S. Wallace
*Attorney, Agent, or Firm*—Peter D. McDermott; Roger L. May

[57] ABSTRACT

The invention relates to a camshaft mounting for a one-piece camshaft supported in a cylinder head having three undivided bearing blocks. The camshaft 5 has three bearing portions of small diameter. One end bearing block (4) has a bore of the same diameter as the bearing portion 8. The middle bearing block 3 has a bore 12 of the same diameter as the bearing portion 7 and a cut-out 13 shaped to allow the cams 9 to pass through one by one if the camshaft 5 is correctly oriented. The last bearing block has a larger bore 16 and is fitted with a bush 15 after insertion of the cams of the camshaft. The camshaft is assembled by sequentially rotating it to align the cams one by one with the cut-out 13 and axial displacement. The bush 15 may be inserted after the camshaft has been slid into position or may be placed over the bearing portion 6 before the camshaft is finally pushed home.

3 Claims, 2 Drawing Figures

CAMSHAFT BEARING AND METHOD FOR MOUNTING THE CAMSHAFT

Figure 1:
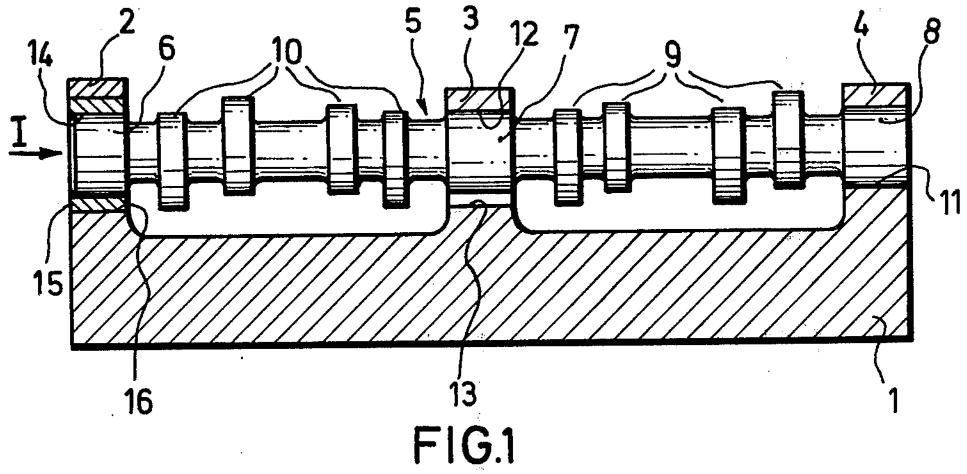

The invention relates to a camshaft mounting and to a process for assembling a camshaft.

The simplest type of camshaft mounting and process for assembling a camshaft involves drilling bearing bores in the bearing blocks provided on a cylinder head and assembling the one-piece camshaft by pushing it in axially from one side. Such a camshaft mounting and such an assembly process presuppose that the radius of the bearing bores is larger than the radius of the cam vertices, which means that disproportionately large bearing diameters have to be selected for the mounting of the camshaft. The provision of such large bearing diameters is difficult from the point of view of construction and entails an increased outlay in terms of material and machining. Furthermore, such large bearing diameters have the disadvantage that their corresponding bearing friction is disproportionately large as regards the requirements of the camshaft mounting.

A further type of camshaft mounting and process for assembling the camshaft involves providing divided bearing blocks and introducing the camshaft radially. However, this requires that, after appropriate machining of the mating faces of a divided bearing block, all the bearing bores of the camshaft have to be drilled in a common drilling operation, and the bearing blocks then have to be separated and reassembled after the camshaft has been introduced between them. Consequently, a considerable outlay in terms of machining and assembly has to be allowed for, to produce a camshaft mounting with smaller bearing diameters and a more favourable bearing friction.

A further camshaft mounting and a process for assembling a camshaft are known from German Offenlegungsschrift No. 2,706,021, in which the camshaft is divided into several parts which are connected to one another in the region of undivided bearing blocks via appropriate connecting elements. The outlay in terms of machining and assembly which is necessary for this is considerable, and the bearing bores required for the camshaft again have to be disproportionately large.

The invention seeks to provide a camshaft mounting and a process for assembling a camshaft, in which a one-piece camshaft with bearing portions of small diameter can be arranged in a simple way in undivided bearing blocks.

According to one aspect of the invention, there is provided a camshaft mounting for a one-piece camshaft supported in three undivided bearing blocks of a cylinder head, in which the bearing bore in a bearing block at one end of the camshaft has a diameter which corresponds to the diameter of a bearing portion on the camshaft, the middle bearing block has a bore of which the diameter corresponds to the diameter of a middle bearing portion of the camshaft and an additional cut-out on the unloaded side of the bearing shaped to permit passage of the cams of the camshaft during assembly, and the bearing block at the other end of the camshaft has a diameter sufficiently large to envelope all the cam vertices.

The invention also provides a process for assembling a camshaft in a camshaft mounting as herein set forth in claim 3.

Because the bearing bore in one end bearing block corresponds to the diameter of the bearing portion on the camshaft and the bore in the middle bearing block likewise corresponds to the diameter of the bearing portion, with the exception of the cut-out, the diameters of the bearing portions on the camshaft and, the diameters of the bearing bores can be kept small and yet the camshaft can be assembled in a simple way by being pushed axially into undivided bearing blocks.

As a result, the friction on the camshaft is kept low without detracting from the advantages offered by a one-piece camshaft and undivided bearing blocks.

Figure 2:
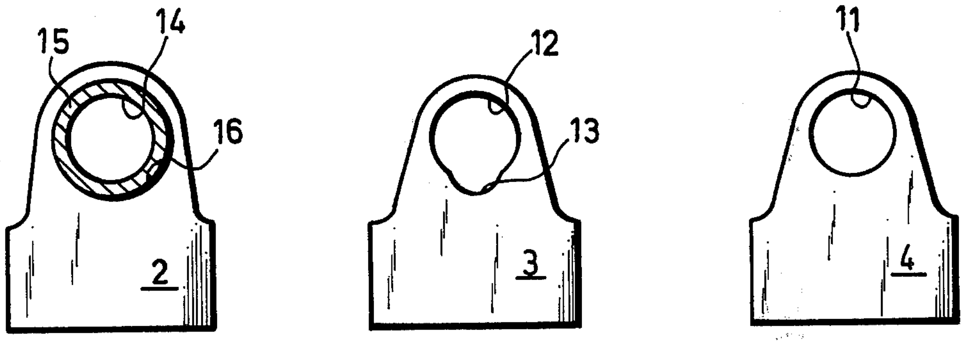

The invention will now be described further by way of example, with reference to the accompanying drawing, in which:

FIG. 1 shows a diagrammatic sectional representation of a camshaft mounting of the invention, and FIG. 2 shows views of the three bearing blocks in the direction of the arrow 1 in FIG. 1.

In the Figures, a cylinder head 1 had three bearing blocks 2, 3 and 4. A one piece camshaft 5 has three bearing portions 6, 7 and 8 of small diameter, by which it is meant that the diameter is less than the size necessary to envelope the vertices of all the cams. The camshaft 5 has two groups of cams, namely rear cams 9 and front cams 10.

The bearing bore 11 in the rear block 4 has a diameter corresponding to that of the bearing portion 8 of the camshaft 5.

The bearing bore 12 in the middle bearing block 3 likewise corresponds to the diameter of the bearing portion 7 of the camshaft 5, with the exception of an additional cut-out 13 shaped according to the cam contour and arranged on the unloaded side of the bearing.

The bearing bore 14 for the front bearing portion 6 of the camshaft 5 is made in a bush 15, the outside diameter 16 of which has a diameter enveloping all the cam vertices.

To assemble the camshaft 5 in the camshaft mounting 11, 12, 14, 15 and 16 described, the camshaft 5 is pushed axially into the bearing bores from the front via an appropriately controlled assembly device. The camshaft is successively rotated and moved axially in such a way that the rear cams 9 are made to coincide one by one with the cut-out 13 and are moved through the middle block while the front cams 10 pass through the bore 16 for the bush 15. Just prior to pushing all the bearing portions 6, 7 and 8 into their final position, the bush 15 is placed on the front bearing portion 6 and then the camshaft is slid axially together with the bush 15 into its final position as shown in FIG. 1. After insertion, the bush 15 is secured in position in an appropriate manner.

As an alternative to this, the bush 15 can be inserted after the camshaft has been pushed into the rear and middle bearings.

I claim:

1. A camshaft mounting for a one-piece camshaft supported in three undivided bearing blocks of a cylinder head, in which the bearing bore in a bearing block at one end of the camshaft has a diameter which corresponds to the diameter of a bearing portion on the camshaft, the middle bearing block has a bore of which the diameter corresponds to the diameter of a middle bearing portion of the camshaft and an additional cut-out longitudinal groove on the unloaded side of the bearing shaped to permit passage of the cams of the camshaft during assembly, and the bearing block at the other end of the camshaft has a diameter sufficiently large to envelope all the cam vertices.

2. A camshaft mounting as claimed in claim 1, in which a bush is mounted within the bore in the bearing block at the said other end of the camshaft, the bush having an inner diameter corresponding to the diameter of a bearing portion at the other end of the camshaft.

3. A process for assembling a camshaft in a camshaft mounting as claimed in claim 2, comprising the steps of prior to insertion of the bush pushing the camshaft axially by means of an assembly device into the bearing bores from the said other end, rotating the camshaft to align each cam successively with the cut-out in the middle bearing block and then pushing the camshaft axially through said other end and middle bearing blocks, mounting the bush in the bearing position at the other end of the camshaft either during or after insertion of the camshaft bearing portions into the bores in the bearing blocks.

* * * * *